United States Patent
Kusanagi

(10) Patent No.: US 8,508,601 B2
(45) Date of Patent: Aug. 13, 2013

(54) OPTICAL APPARATUS, IMAGE SENSING DEVICE, AND CONTROL METHODS THEREOF

(75) Inventor: Suguru Kusanagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 13/149,204

(22) Filed: May 31, 2011

(65) Prior Publication Data

US 2012/0002060 A1 Jan. 5, 2012

(30) Foreign Application Priority Data

Jul. 1, 2010 (JP) ................................. 2010-151436

(51) Int. Cl.
*H04N 13/02* (2006.01)
*H04N 5/228* (2006.01)

(52) U.S. Cl.
USPC ............. 348/208.11; 348/47; 348/208.2; 348/208.5; 348/208.6; 348/208.7

(58) Field of Classification Search
USPC ............. 348/47, 208.99, 208.2, 208.4, 208.5, 348/208.6, 208.7, 208.11, 208.12
See application file for complete search history.

(56) References Cited

U.S. PATENT DOCUMENTS

| | | | | |
|---|---|---|---|---|
| 5,448,294 | A | * | 9/1995 | Yamazaki .................. 348/230.1 |
| 5,672,862 | A | * | 9/1997 | Ohara et al. .................. 250/204 |
| 5,786,847 | A | * | 7/1998 | Katayama et al. ............... 348/47 |
| 7,209,164 | B2 | * | 4/2007 | Nishimura et al. ...... 348/207.99 |
| 8,169,489 | B2 | * | 5/2012 | Orimoto et al. ............ 348/208.4 |
| 8,189,100 | B2 | * | 5/2012 | Li et al. .......................... 348/376 |
| 2011/0007133 | A1 | * | 1/2011 | Imanishi ......................... 348/42 |

FOREIGN PATENT DOCUMENTS

JP 07-043647 2/1995

* cited by examiner

*Primary Examiner* — Daniel M Pasiewicz
(74) *Attorney, Agent, or Firm* — Cowan, Liebowitz & Latman, P.C.

(57) ABSTRACT

An image sensing device includes two, left- and right-eye image sensors, and detects the rotation amount around the optical axis of the image sensing device, and the displacement amounts of the two image sensors in a plane perpendicular to the optical axis. The image sensing device performs control such that two pixels on the two image sensors having output the centers of the images to be cropped from the sensed images exist in the same position in the vertical direction in the plane perpendicular to the optical axis. The image sensing device also performs control such that the horizontal distance, in the plane perpendicular to the optical axis, between the two pixels of the two image sensors having output the centers of the images to be cropped from the sensed images is equal to the spacing between the two image sensors.

9 Claims, 5 Drawing Sheets

OPTICAL APPARATUS, IMAGE SENSING DEVICE, AND CONTROL METHODS THEREOF

BACKGROUND OF THE INVENTION

1. Field of the Invention

The present invention relates to a technique for correcting a camera shake of an image sensing device.

2. Description of the Related Art

A human brain can perceive depth by the disparity between images captured by the left and right eyes. That is, a human can perceive three dimension when images having disparity are presented to the left and right eyes. Therefore, binocular stereoptical image presenting techniques (stereopsis) using a polarization method, liquid crystal shutter method, and the like are known.

To generate a left-eye image and right-eye image for binocular stereopsis, a method of sensing images by using two image sensing devices spaced apart by the eye separation or a method using 3D computer graphics rendered by moving the viewpoint position has conventionally been used. An apparatus adopting the former image sensing method using two image sensing devices is large in size and has not been manufactured as a household product. However, as the number of pixels of an image sensor is increased and the sensor itself is downsized, the binocular stereoptical image sensing device has been downsized. Recently, an image sensing device including two image sensing optical systems has been developed as a household digital camera or the like. Accordingly, users can sense binocular stereoptical images in hand carried devices in the same manner as when they use general image sensing devices.

When viewing a binocular stereoptical moving image sensed by a hand carried device as described above, a viewer sometimes feels fatigued because image blurring due to camera shake or the like during image sensing or a frequent change in gaze point causes so-called "3D sickness". Japanese Paten Laid-Open No. 07-043647 has disclosed a technique for correcting image "blurring" in the horizontal and vertical directions in a plane perpendicular to the optical axis of an optical apparatus including two optical systems such as a binocular.

In hand-carry image sensing, however, image "blurring" due to rotation around the optical axis sometimes occurs in addition to the horizontal and vertical camera shakes described in Japanese Patent Laid-Open No. 07-043647. In the image sensing device using two image sensing optical systems, however, the following problem arises if the conventional method of cropping a rectangular region by rotating a sensed image in order to correct image "blurring" in the rotational direction is used. If rotation occurs around the optical axis of the image sensing device using two image sensing optical systems, the distances between the rotation center and image sensors of the two image sensing optical systems are different. Therefore, a position in an image obtained by sensing a given object differs from that in an image obtained by sensing the same object with no rotation. That is, binocular stereopsis fails if simply rotated images are used.

SUMMARY OF THE INVENTION

The present invention has been made in consideration of the problem of the prior art as described above. The present invention provides image blur correction that does not spoil binocular stereopsis.

The present invention in its first aspect provides an optical apparatus including two optical systems arranged parallel at a predetermined spacing, comprising: a shake detection unit configured to detect a shake of the apparatus, wherein the shake detection unit detects at least a rotational shake around an optical axis of the optical system; two correction units configured to correct image blur of optical images formed by the optical systems, based on the shake detected by the shake detection unit; a displacement detection unit configured to detect a displacement amount in a plane perpendicular to the optical axis when rotation occurs around the optical axis of the optical system, for each of the two correction units; and a correction control unit configured to control such that in the plane perpendicular to the optical axis, the two correction units exist in the same position in a vertical direction, and a horizontal distance between the two correction units is equal to the predetermined spacing.

Further features of the present invention will become apparent from the following description of exemplary embodiments (with reference to the attached drawings).

DESCRIPTION OF THE EMBODIMENTS

First Embodiment

A preferred embodiment of the present invention will be explained in detail below with reference to the accompanying drawings. Note that in the following embodiment, an example in which the present invention is applied to a digital camera including two image sensing optical systems for the left and right eyes and capable of outputting binocular stereoptical images will be explained as an example of an image sensing device. However, the present invention is applicable to a given apparatus capable of sensing binocular stereoptical still images and moving images.

Figure 1:
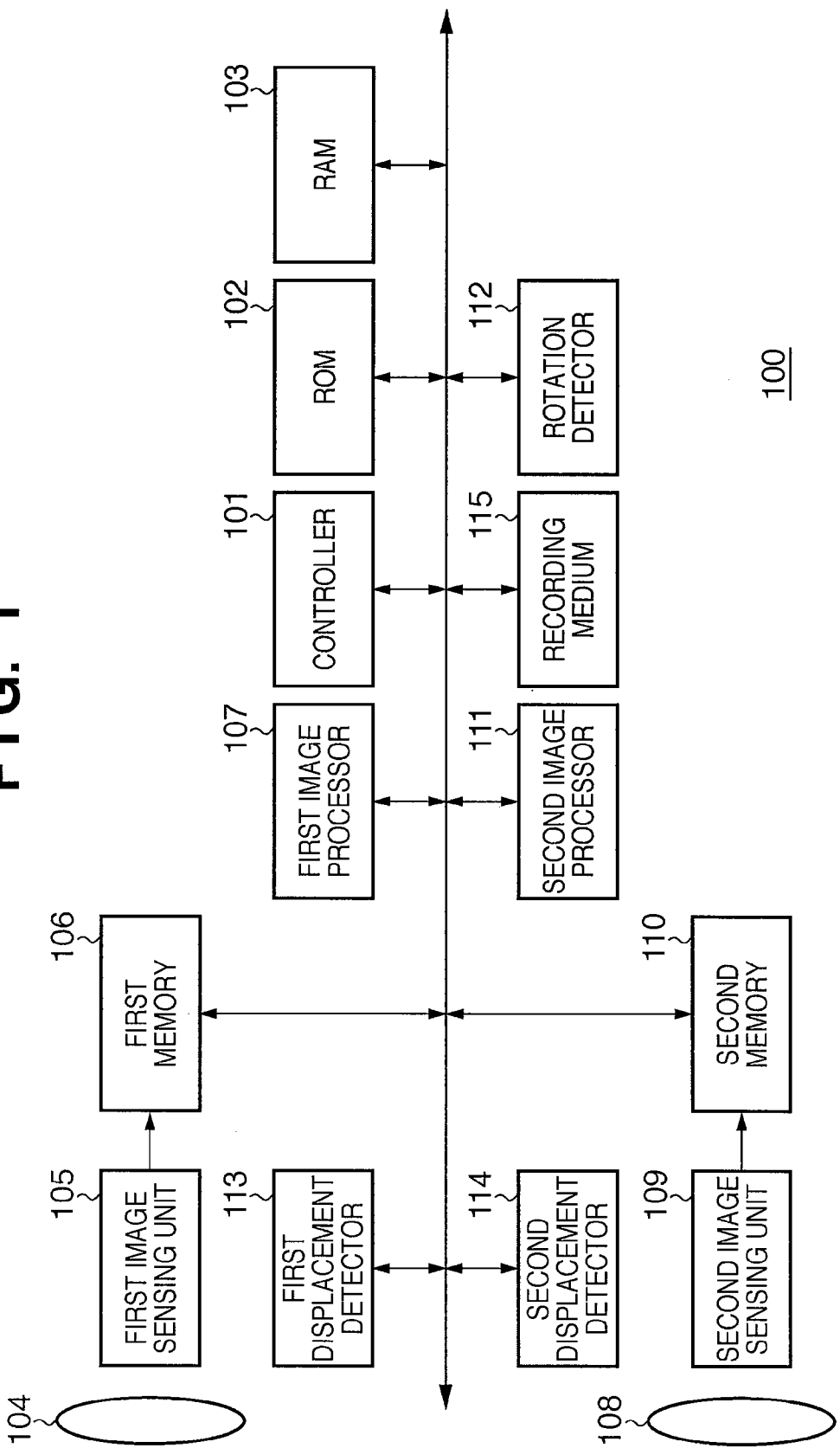
FIG. 1 is a block diagram showing the functional configuration of an image sensing device according to an embodiment of the present invention.

FIG. 1 is a block diagram showing the functional configuration of a digital camera 100 according to the embodiment of the present invention. Note that in this embodiment, each block beginning with "first" performs processing for left-eye images, and each block beginning with "second" performs processing for right-eye images.

A controller 101 is, for example, a CPU. The controller 101 reads out an operation program, which is stored in a ROM 102, of each block of the digital camera 100, loads the readout program into a RAM 103, and executes the program, thereby controlling the operation of each block of the digital camera 100. The ROM 102 is a programmable nonvolatile memory, and stores settings, parameters, and the like necessary for the operations of individual blocks of the digital camera 100, in addition to the operation programs of these blocks. The RAM 103 is a programmable volatile memory, and used as, for example, a memory area for temporary data generated by the operation of each block of the digital camera 100.

A first optical system 104 is an image sensing optical system formed by lenses such as an image sensing lens and focusing lens. A first image sensing unit 105 is, for example, an image sensor, and photo-electrically converts an optical image formed by the first optical system 104, thereby obtaining an analog image signal. Also, the first image sensing unit 105 applies A/D conversion to the analog image signal, and outputs an obtained digital image to a first memory 106. The first memory 106 is a memory area for storing left-eye images output from the first image sensing unit 105. In addition to the left-eye images output from the first image sensing unit 105, the first memory 106 stores left-eye images having undergone various image conversion processes performed by a first image processor 107 (to be described below). The first image processor 107 applies image processing such as exposure correction, γ correction, and white balance adjustment to an input digital image. The first image processor 107 also performs a process of cropping an image of a partial region from an input digital image, and a process of rotating an input image, thereby correcting rotation around the optical axis of the digital camera 100.

Note that the first optical system 104, first image sensing unit 105, first memory 106, and first image processor 107 described above are blocks for outputting left-eye images of binocular stereopsis. To output right-eye images of binocular stereopsis in the digital camera 100, a second optical system 108, second image sensing unit 109, second memory 110, and second image processor 111 are used, but the processes of these blocks are the same as those of the blocks for left-eye images, so a repetitive explanation will be omitted. Note that the left-eye image sensor of the first image sensing unit 105 and the right-eye image sensor of the second image sensing unit 109 are arranged at a predetermined spacing corresponding to the human eye separation.

A rotation detector 112 is, for example, a gravity sensor, and detects a change in posture of the digital camera 100 at a predetermined time interval, thereby detecting the rotation amount of the digital camera 100. Note that in this embodiment, the rotation detector 112 is particularly used to detect rotation around the optical axis. The rotation amount of the digital camera 100 detected by the rotation detector 112 is transmitted to the controller 101.

A first displacement detector 113 and second displacement detector 114 are, for example, acceleration sensors, and respectively detect, at a predetermined time interval, spatial displacements occurring in the left-eye image sensor of the first image sensing unit 105 and the right-eye image sensor of the second image sensing unit 109 (displacement detection). When rotation occurs around the optical axis of the digital camera 100 of this embodiment, displacements having different displacement amounts occur in accordance with the positional relationships with the rotation center. For example, if rotation having the rotation center to the right of the right-eye image sensor of the two image sensors occurs in the digital camera 100, the displacement amounts of the two image sensors are different because the distances from the two image sensors to the rotation center are different. Also, if rotation whose rotation center is the middle point of a straight line connecting the centers of the two image sensors occurs in the digital camera 100, the distances from the two image sensors to the rotation center are the same, but the image sensors are displaced in different directions. Note that, for the sake of simplicity, the first displacement detector 113 and second displacement detector 114 of this embodiment detect the displacement amounts of the image sensors in a plane perpendicular to the optical axis when rotation occurs around the optical axis of the digital camera 100. Note also that the digital camera 100 of this embodiment includes the rotation detector 112 in order to facilitate detecting rotation around the optical axis. However, the rotation amount around the optical axis may be obtained from the displacement amounts obtained by the first displacement detector 113 and second displacement detector 114.

A recording medium 115 is a recording device such as a built-in memory of the digital camera 100 or a memory card or HDD detachable from the digital camera 100. The recording medium 115 records the left-eye images and right-eye images respectively output from the first memory 106 and second memory 110. Note that in this embodiment, the recording medium 115 records binocular stereoptical images. However, the present invention is not limited to this, and it is also possible to output binocular stereoptical images to a display device connected to the digital camera 100.

In this embodiment, the first optical system 104 and second optical system 108 may have correction optical systems, and reduce shakes during a storage period by driving the correction optical systems in a direction almost perpendicular to the optical axis based on the shakes. Likewise, shakes during the storage period may be reduced by driving the image sensors of the first image sensing unit 105 and second image sensing unit 109 in the direction almost perpendicular to the optical axis based on the shakes. Furthermore, the rotation detector 112, first displacement detector 113, and second displacement detector 114 can also be gyro sensors. In this case, the rotation detector 112 is a sensor for sensing vibrations in the roll direction, and the first displacement detector 113 and second displacement detector 114 are respectively sensors for sensing vibrations in the yaw direction and pitch direction. It is also necessary to take account of the distances from the gyro sensors to each image sensor in order to take the displacement amount of the image sensor into account.

(Rotation Correction Process)

Figure 2:
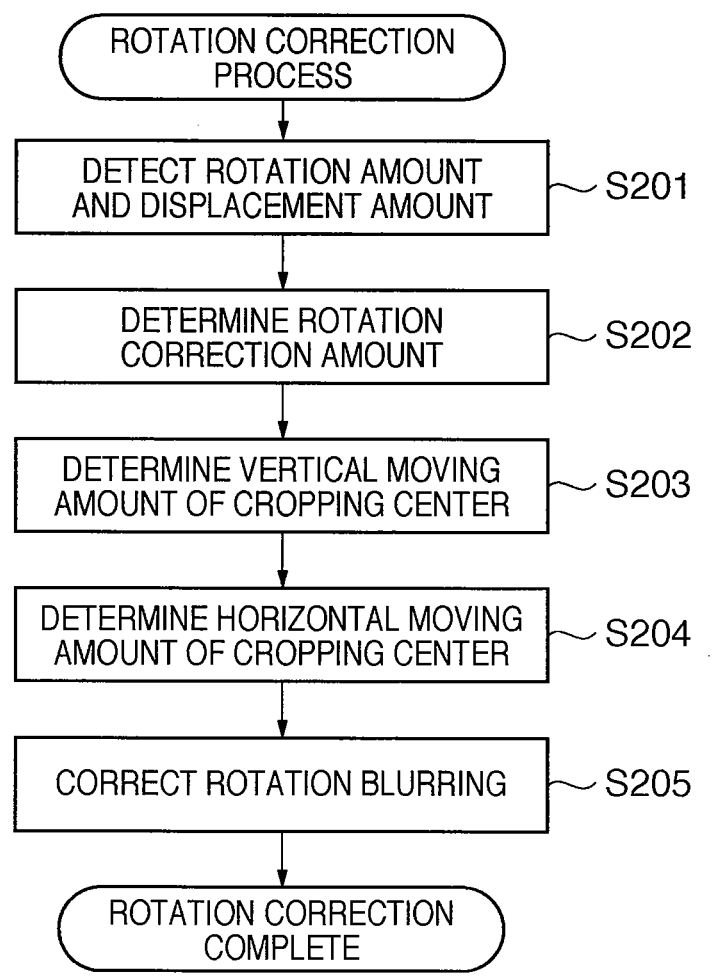
FIG. 2 is a flowchart of a rotation correction process of an embodiment of the present invention.

Practical processing of a rotation correction process of the digital camera 100 of this embodiment having the above-mentioned arrangement will be explained below with reference to a flowchart shown in FIG. 2. Processing corresponding to this flowchart can be implemented by the controller 101 by reading out a corresponding processing program stored in the ROM 102, loading the readout program into the RAM 103, and executing the program. Note that this rotation correction process is started when, for example, the user performs binocular stereoptical image sensing by using the digital camera 100.

If it is detected in S201 that the user designates image sensing in an operation input unit (not shown), the controller 101 detects the rotation amount and displacement amount of the digital camera 100 when image sensing is designated. More specifically, the controller 101 causes the rotation detector 112 to detect the rotation amount around the optical axis of the digital camera 100, and the RAM 103 to store the detected rotation amount. Also, the controller 101 causes the first displacement detector 113 and second displacement detector 114 to respectively detect the displacement amounts of the left-eye image sensor and right-eye image sensor, and the RAM 103 to store the detected displacement amounts of these image sensors.

In S202, the controller 101 determines an image rotation correction amount for correcting the rotation around the optical axis. More specifically, the controller 101 determines whether the rotation amount around the optical axis of the digital camera 100 detected by the rotation detector 112 in step S201 has exceeded a limit amount (maximum rotation correction amount) for correcting the rotation. The maximum rotation correction amount is information defining a maximum rotational angle for correcting the rotation of a sensed image. The maximum rotation correction amount can be prestored in the ROM 102, and can also be a value settable by the user. If the detected rotation amount around the optical axis of the digital camera 100 has exceeded the maximum rotation correction amount, the controller 101 sets the rotation correction amount to the maximum rotation correction amount; if not, the controller 101 sets the rotation correction amount to the rotation amount around the optical axis detected by the rotation detector 112. Note that in order to correct the rotation around the optical axis of the digital camera 100, the rotation correction amount has a value in the opposite direction to the rotation detected by the rotation detector 112.

In S203, in order to correct the vertical displacement amounts of the left- and right-eye image sensors, which are generated by the rotation around the optical axis of the digital camera 100, the controller 101 determines the vertical moving amount of the cropping center of a corrected image of the image output from each image sensor. In the digital camera 100 of this embodiment, left- and right-eye images corresponding to images when no rotation occurs around the optical axis are generated from images output from the left- and right-eye image sensors when rotation occurs around the optical axis. Images at the optical centers of the left- and right-eye image sensing optical systems before rotation occurs around the optical axis are respectively shifted in directions opposite to the displacement directions from the centers by the displacement amounts detected by the first displacement detector 113 and second displacement detector 114. To generate an image by correcting the rotation around the optical axis, therefore, the center of the sensed image is corrected to the position corresponding to the image at the optical center before rotation occurs around the optical axis. In this step and in S204 (to be described later), the controller 101 determines the positions of the cropping centers in the images output from the left- and right-eye image sensors, in order to correct the displacement amounts of these image sensors, which are generated by the rotation around the optical axis.

Figure 3:
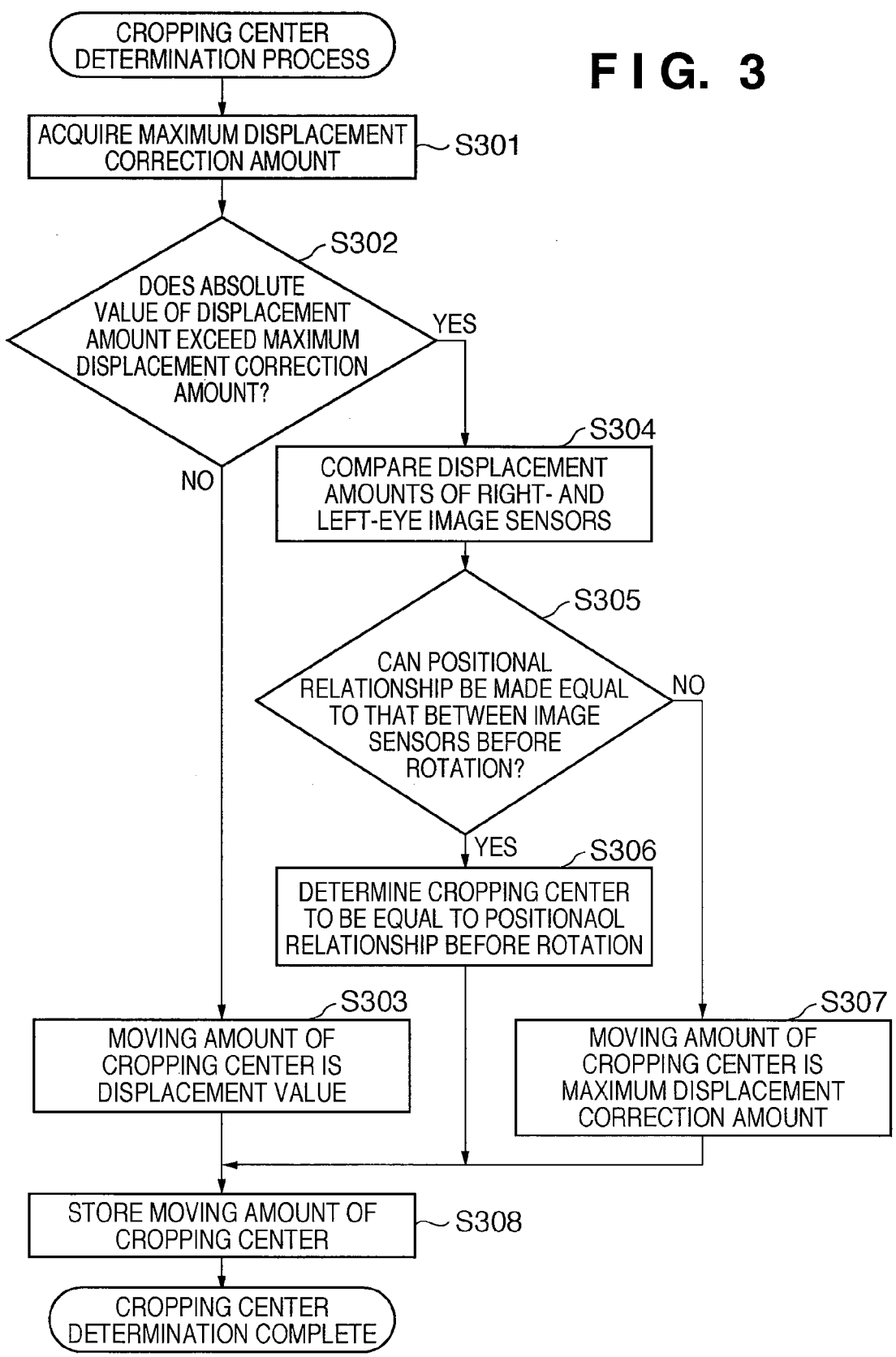
FIG. 3 is a flowchart of a cropping center determination process of an embodiment of the present invention.

A cropping center determination process of determining the vertical moving amount of the center of an image to be cropped from the image output from each image sensor in order to correct the displacement amount of the image sensor will be explained below with reference to a flowchart shown in FIG. 3.

In S301, the controller 101 acquires a vertical limit amount (maximum displacement correction amount) for correcting the displacement amount of each of the left- and right-eye image sensors. In this embodiment, information of the maximum displacement correction amount is prestored in the ROM 102. However, the maximum displacement correction amount may also be calculated from the rotation correction amount determined in S202 of the rotation correction process, and a predetermined size (a predetermined number of pixels) of an image to be cropped.

In S302, the controller 101 determines whether the absolute value of at least one of the displacement amounts of the two image sensors stored in the RAM 103 has exceeded the maximum displacement correction amount acquired in S301. If the absolute value of at least one of the vertical displacement amounts of the two image sensors has exceeded the maximum displacement correction amount, the controller 101 advances the process to S304; if not, the controller 101 advances the process to S303.

Figure 4A:
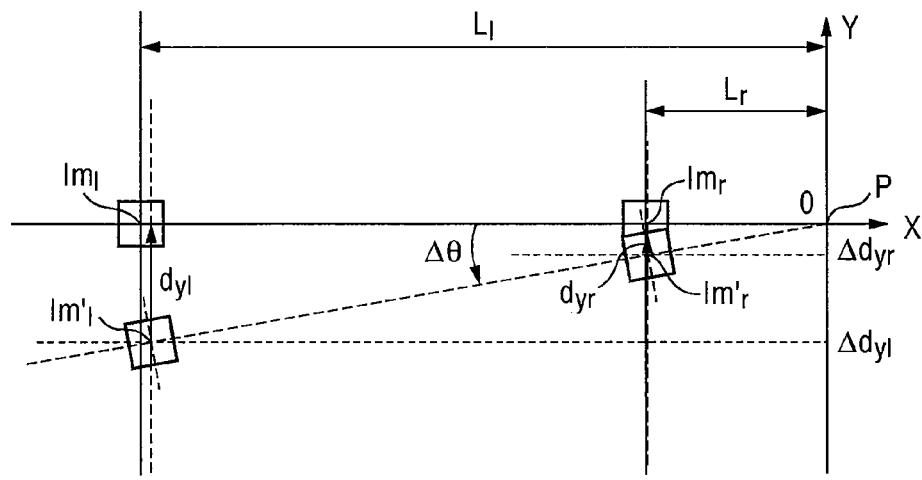
FIGS. 4A, 4B, and 4C are views for explaining a vertical cropping center determined by the cropping center determination process.

In S303, the controller 101 determines the vertical moving amount of the cropping center of the corrected image of the image output from each of the left- and right-eye image sensors, as the amount to be moved in the direction opposite to the displacement direction from the center of the output image by the displacement amount of the image sensor having output the image. For example, when a rotation of $\Delta\theta$ occurs around a rotation center P (origin) as shown in FIG. 4A, the coordinates of centers $Im_l$ and $Im_r$ of the left- and right-eye image sensors before the rotation are respectively given by $$Im_l=(-L_l,0)$$

$$Im_r=(-L_r,0)$$

where $L_l$ and $L_r$ respectively indicate the distances from the rotation center P to the left- and right-eye image sensors. The coordinates of centers $Im_l'$ and $Im_r'$ of the left- and right-eye image sensors after the rotation are respectively given by $$Im_l'=(-L_l\cos\Delta\theta,-L_l\sin\Delta\theta)$$

$$Im_r'=(-L_r\cos\Delta\theta,-L_r\sin\Delta\theta)$$

That is, displacements $\Delta d_l$ and $\Delta d_r$ of the left- and right-eye image sensors can be represented by $$\Delta d_l=(\Delta d_{xl},\Delta d_{yl})=(L_l(1-\cos\Delta\theta),-L_l\sin\Delta\theta)$$

$$\Delta d_r=(\Delta d_{xr},\Delta d_{yr})=(L_r(1-\cos\Delta\theta),-L_r\sin\Delta\theta)$$

If the relationships with a maximum displacement correction amount $d_{ymax}$ in the vertical direction are given by $$|\Delta d_{yl}|\leq d_{y\,max} \text{ and } |\Delta d_{yr}|\leq d_{y\,max}$$

vertical moving amounts $d_{yl}$ and $d_{yr}$ of the cropping centers in the images output from the left- and right-eye image sensors after the rotation are given by $$d_{yl}=-\Delta d_{yl}=L_l\sin\Delta\theta$$

$$d_{yr}=-\Delta d_{yr}=L_r\sin\Delta\theta$$

indicating that the cropping centers move in the directions opposite to the displacement directions by the displacement amounts of the left- and right-eye image sensors from the centers of the images output from these image sensors.

If the absolute value of at least one of the vertical displacement amounts of the left- and right-eye image sensors has exceeded the maximum displacement correction amount in S302, the controller 101 compares the displacement amounts of the left- and right-eye image sensors in S304. In this step, the controller 101 determines an image sensor whose displacement is to be preferentially corrected. Note that if the displacement amounts are equal because, for example, the rotation center exists in the middle point between the two image sensors, it is possible to preferentially correct the displacement amount of, for example, the left-eye image sensor.

In S305, the controller 101 determines whether the positional relationship between the images at the centers of the images to be cropped from the images obtained from the left- and right-eye image sensors after the rotation can be made equal to that between the centers of these image sensors before the rotation. More specifically, the controller 101 determines whether pixels on the left- and right-eye image sensors having output the central images of the images to be cropped from the images obtained after the rotation can be set in the same position in the vertical direction on a plane perpendicular to the optical axis.

Figure 4B:
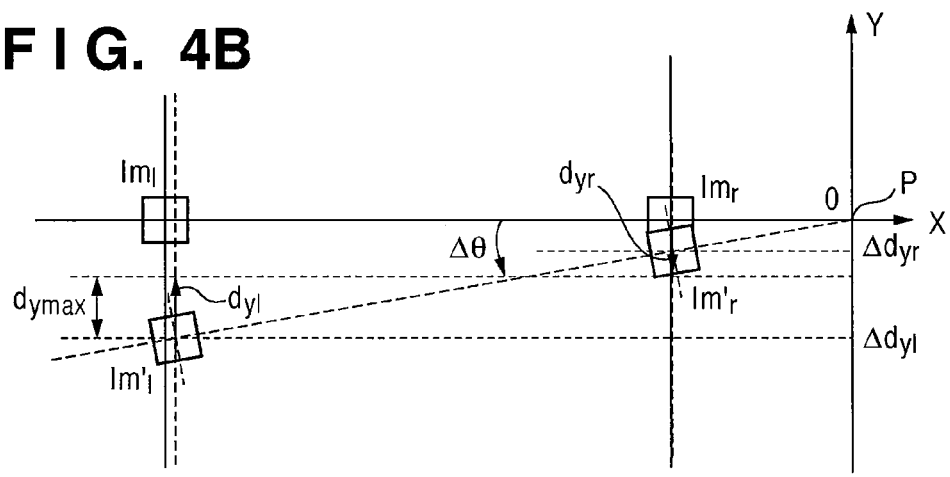

Assume that, as shown in FIG. 4B, an image sensor found to have a larger displacement amount in S304 is the left-eye image sensor ($|\Delta d_{yl}|>|\Delta d_{yr}|$). Since the left-eye image sensor after the rotation has a displacement larger than the maximum displacement correction amount, a position moved in the direction opposite to the displacement direction by the maximum displacement correction amount is set as the center of the image to be cropped from the image output from the left-eye image sensor. That is, the vertical moving amount $d_{yl}$ of the cropping center in the image obtained from the left-eye image sensor is given by $$d_{yl}=d_{y\,max}(<|\Delta d_{yl}|)$$

indicating that the cropping center is moved in the direction opposite to the displacement direction from the center of the image output from the left-eye image sensor.

In this case, the following problem arises if the center of the image to be cropped from the image obtained from the right-eye image sensor is moved in the direction opposite to the displacement direction by the displacement amount of the right-eye image sensor. That is, the central images of the images to be cropped from the images obtained from the left- and right-eye image sensors after the rotation are shifted from each other on the left and right sides in the vertical direction. In S305, whether this vertical shift occurs in the images to be cropped from the images obtained from the left- and right-eye image sensors after the rotation is determined by $$|\Delta d_{yl}-\Delta d_{yr}|\leq 2d_{y\,max} \quad (1)$$

If the vertical positional relationships between the images the centers of the images to be cropped from the images obtained from the left- and right-eye image sensors after the rotation can be made equal to each other, the controller 101 advances the process to S306; if not, the controller 101 advances the process to S307.

In S306, the controller 101 determines the vertical moving amounts of the cropping centers such that the pixels on the left- and right-eye image sensors having output the central images of the images to be cropped from the images obtained after the rotation exist in the same position in the vertical direction on the plane perpendicular to the optical axis. For example, in a case shown in FIG. 4B, the vertical moving amounts of the cropping centers in the images obtained from the left- and right-eye image sensors are given by $$d_{yl}=d_{y\,max}$$

$$d_{yr}=\Delta d_{yl}-\Delta d_{yr}+d_{y\,max}$$

Note that if $d_{yl}$ is movement in the negative direction, the sign of $d_{ymax}$ is inverted.

Figure 4C:
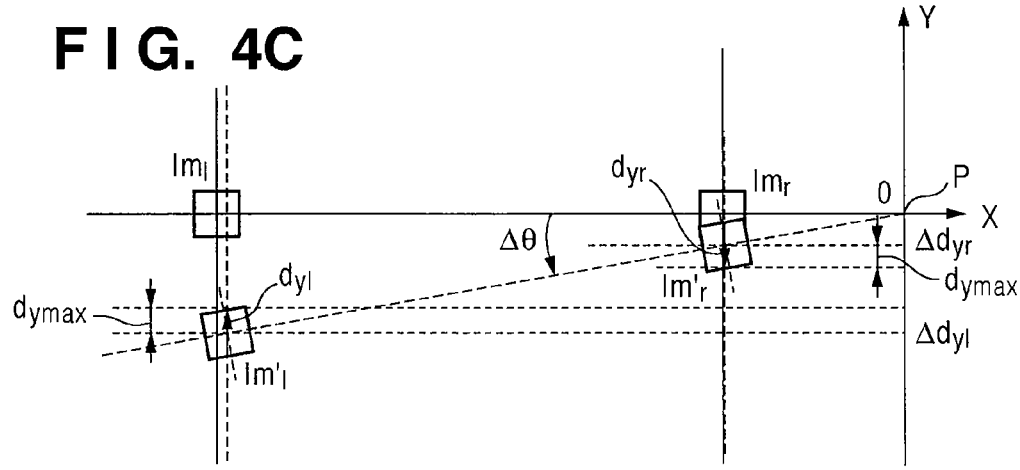

In S307, the controller 101 determines the vertical moving amounts of the cropping centers so as to minimize the difference between the positions, in the vertical direction on the plane perpendicular to the optical axis, of the pixels on the left- and right-eye image sensors having output the central images of the images to be cropped from the images obtained after the rotation. For example, if expression (1) is not met as shown in FIG. 4C, the vertical moving amounts of the cropping centers in the images obtained from the left- and right-eye image sensors are given by $$d_{yl}=d_{y\,max}$$

$$d_r=-d_{y\,max}$$

each having an absolute value equal to the maximum displacement correction amount.

Note that if $d_{yl}$ is movement in the negative direction, the sign of $d_{ymax}$ is inverted.

In S308, the controller 101 stores information of the cropping center vertical moving amounts thus determined in, for example, the RAM 103, and completes this cropping center determination process.

In S204, the controller 101 determines the horizontal moving amounts of the cropping centers of the corrected images of the images output from the left- and right-eye image sensors, in order to correct the horizontal displacement amounts of these image sensors generated by the rotation around the optical axis of the digital camera 100. Note that a cropping center determination process of determining the horizontal moving amounts of the cropping centers in the images output from the two image sensors will be explained below with reference to the flowchart shown in FIG. 3, but an explanation of the same processing contents as those of the vertical moving amounts will not be repeated.

In S303, the controller 101 determines the vertical moving amount of the cropping center of the corrected image of the image output from each of the left- and right-eye image sensors, as the amount to be moved in the direction opposite to the displacement direction by the displacement amount of the image sensor having output the image from the center of the output image. For example, when a rotation of $\Delta\theta$ occurs around the rotation center P (origin) as shown in FIG. 4A and the relationships with a maximum displacement correction amount $d_{xmax}$ in the horizontal direction are given by $$|\Delta d_{xl}|\leq d_{x\,max} \text{ and } |\Delta d_{xr}|\leq d_{x\,max}$$

horizontal moving amounts $d_{x1}$ and $d_{xr}$ of the cropping centers in the images output from the left- and right-eye image sensors after the rotation are given by $$d_{xl}=-\Delta d_{xl}=-L_l(1-\cos\Delta\theta)$$

$$d_{xr}=-\Delta d_{xr}=-L_r(1-\cos\Delta\theta)$$

indicating that the cropping centers are moved in the directions opposite to the displacement directions by the displacement amounts of the two image sensors from the centers of the images output from these image sensors.

In S305, the controller 101 determines whether the distance, on the plane perpendicular to the optical axis, between the pixels on the left- and right-eye image sensors having output the central images of the images to be cropped from the images obtained after the rotation can be made equal to the spacing between the centers of these image sensors before the rotation.

Figure 5:
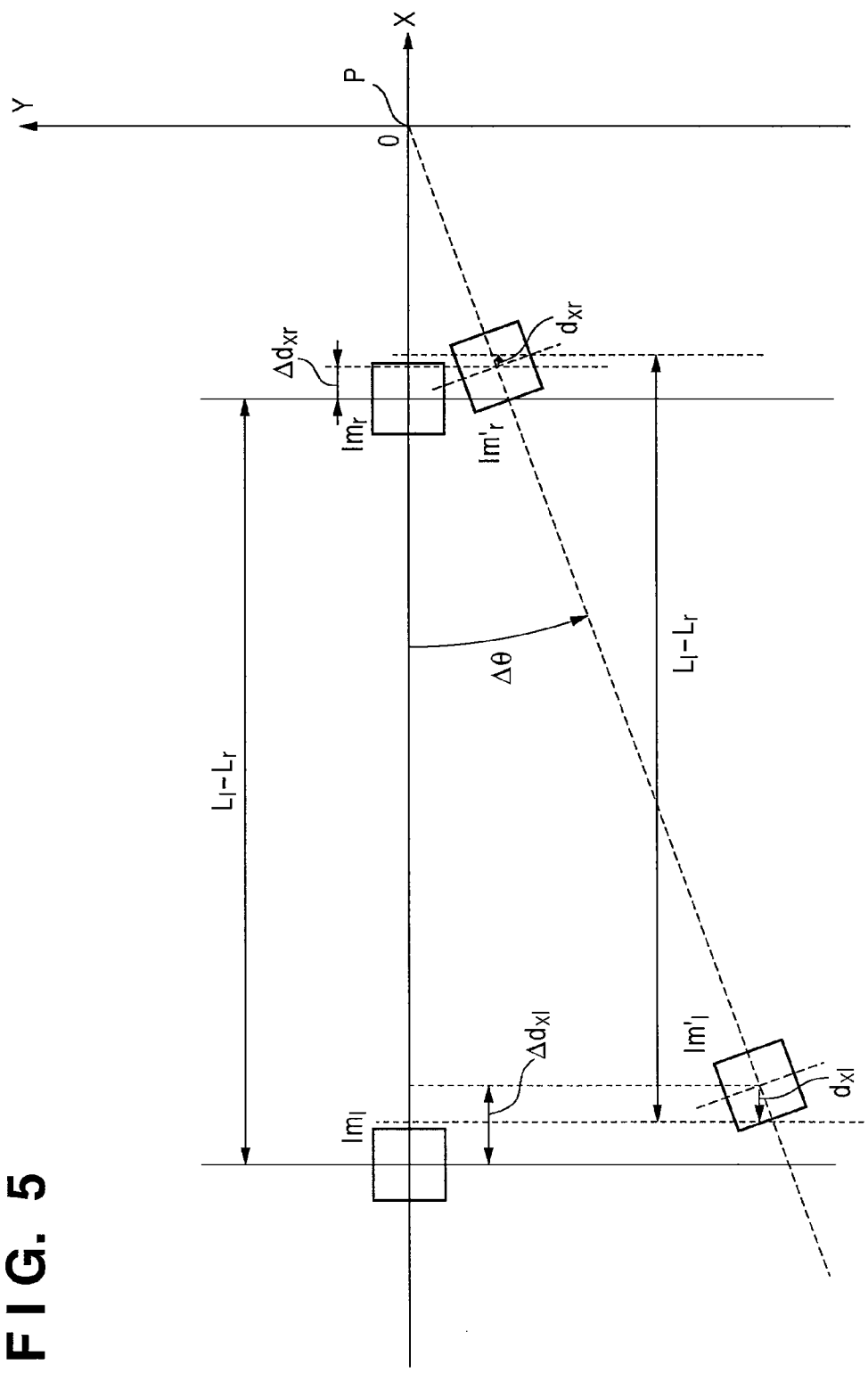
FIG. 5 is a view for explaining a horizontal cropping center determined by the cropping center determination process.

Assume that, as shown in FIG. 5, an image sensor found to have a larger displacement amount in S304 is the left-dye image sensor ($|\Delta d_{xl}|>|\Delta d_{xr}|$). In this case, the horizontal moving amount $d_{xl}$ of the cropping center in the image obtained from the left-eye image sensor is given by $$d_{xl}=d_{x\,max}(<|\Delta d_{xl}|)$$

indicating that the cropping center is moved in the direction opposite to the displacement direction from the center of the image output from the left-eye image sensor.

In this case, the following problem arises if the center of the image to be cropped from the image obtained from the right-eye image sensor is moved in the direction opposite to the displacement direction by the displacement amount of the right-eye image sensor. That is, the central images of the images to be cropped from the images obtained from the left- and right-eye image sensors after the rotation are shifted from each other on the left and right sides in the horizontal direction. More specifically, the eye separation L changes. In S305, whether this eye separation shift occurs in the images to be cropped from the images obtained from the left- and right-eye image sensors after the rotation is determined by $$|\Delta d_{xl} - \Delta d_{xr}| \leq 2d_{x\,max}$$

If the horizontal eye separations of the images at the centers of the images to be cropped from the images obtained from the left- and right-eye image sensors after the rotation can be made equal to each other, the controller 101 advances the process to S306; if not, the controller 101 advances the process to S307.

In S306, the controller 101 determines the horizontal moving amounts of the cropping centers such that the horizontal eye separation of the central images of the images to be cropped from the images obtained after the rotation is equal to the eye separation before the rotation. For example, in the case shown in FIG. 5, the horizontal moving amounts of the cropping centers in the images obtained from the left- and right-eye image sensors are given by $$d_{xl} = -d_{x\,max}$$

$$d_{xr} = \Delta d_{xl} - \Delta d_{xr} - d_{x\,max}$$

Note that if $d_{xl}$ is movement in the negative direction, the sign of $d_{xmax}$ is inverted.

In S307, the controller 101 determines the horizontal moving amounts of the cropping centers so as to minimize the difference between the horizontal eye separation of the central images of the images to be cropped from the images obtained after the rotation, and the eye separation before the rotation.

$$d_{xl} = -d_{x\,max}$$

$$d_{xr} = d_{x\,max}$$

Note that if $d_{xl}$ is movement in the positive direction, the sign of $d_{xmax}$ is inverted.

In S308, the controller 101 stores information of the cropping center horizontal moving amounts thus determined in, for example, the RAM 103, and completes this cropping center determination process. Note that in this embodiment, the operation when the rotation center does not exist between the left- and right-eye image sensing optical systems has been explained. However, it will readily be understood that even when the rotation center exists between the image sensing optical systems, the processing of this cropping center determination process remains unchanged although the cropping center moving directions change.

In S205, the controller 101 performs a rotation blurring correction process in accordance with the information of the positions of the cropping centers in the images obtained from the left- and right-eye image sensors after the rotation determined in S203 and S204. More specifically, the controller 101 rotates the images obtained from the left- and right-eye image sensors after the rotation by the rotation correction amounts determined in S202. Then, the controller 101 crops images having a predetermined size (a predetermined number of pixels) around the positions of the cropping centers determined in S203 and S204 from the rotated left- and right-eye images, and outputs the cropped images. The cropped images obtained by correcting the rotation blurring are stored in the first memory 106 and second memory 110. After that, the controller 101 stores the images in the recording medium 115.

As has been explained above, the image sensing device of this embodiment can implement image blur correction that does not spoil binocular stereopsis even when rotation blurring occurs around the optical axis. More specifically, the image sensing device includes the two, left- and right-eye image sensors, and detects the rotation amount around the optical axis of the image sensing device, and the displacement amounts of the two image sensors in the plane perpendicular to the optical axis when the rotation occurs around the optical axis. The following processing is performed when correcting the detected rotation amounts and displacement amounts of the two image sensors by cropping images having a predetermined size from the sensed images. The image sensing device performs the processing such that two pixels on the two image sensors having output the centers of images to be cropped from the sensed images exist in the same position in the vertical direction in the plane perpendicular to the optical axis. Also, the image sensing device performs the processing such that the horizontal distance, in the plane perpendicular to the optical axis, between the two pixels on the two image sensors having output the centers of the images to be cropped from the sensed images is equal to the spacing between the two image sensors.

In this manner, the image sensing device can output images that do not spoil binocular stereopsis while correcting the rotation of an object around the optical axis occurring when sensing binocular stereoptical images.

Modifications

In the above-described embodiment, the electronic image blur correction method of outputting images that do not spoil binocular stereopsis by changing cropping positions obtained by image sensing has been explained. However, the present invention is not limited to this embodiment.

For example, if rotation occurs around the optical axis, the optical axis need only be corrected by the vertical and horizontal moving amounts calculated in the above-described embodiment, such that an optical image formation position as the optical center before the rotation is the center of each image sensor. In this case, each of the first optical system 104 and second optical system 108 has a shift lens and corrects the optical image formation position when controlled by a driving system. After that, the same effect as that of the first embodiment is achieved by correcting the rotation amount by rotating a cropping frame from an image output from the image sensor after the rotation.

Also, if rotation occurs around the optical axis, for example, it is also possible to move the image sensors by the vertical and horizontal moving amounts calculated in the above-described embodiment, such that an optical image formation position as the optical center before the rotation is the center of each image sensor. In this case, the first image sensing unit 105 and second image sensing unit 109 each have a driving system, and the optical image formation position is corrected by controlling the position of each unit during image sensing. After that, the same effect as that of the first embodiment is achieved by correcting the rotation amount by rotating a cropping frame from an image output from the image sensor after the rotation. Note that when the image sensing device includes driving systems capable of rotating the image sensors, binocular stereoptical images can be generated without correcting the rotation amounts, that is, without performing any cropping process.

As described above, the present invention is not limited to the electronic image blur correction method, and can be implemented by using at least one of electronic image blur correction and optical image blur correction.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-151436, filed Jul. 1, 2010, which is hereby incorporated by reference herein in its entirety.

What is claimed is:

1. An optical apparatus including two optical systems arranged parallel at a predetermined spacing, comprising:
   a shake detection unit configured to detect a shake of the apparatus, wherein said shake detection unit detects at least a rotational shake around an optical axis of said optical system;
   two correction units configured to correct image blur of optical images formed by said optical systems, based on the shake detected by said shake detection unit;
   a displacement detection unit configured to detect a displacement amount in a plane perpendicular to the optical axis when rotation occurs around the optical axis of said optical system, for each of said two correction units; and
   a correction control unit configured to control such that in the plane perpendicular to the optical axis, said two correction units exist in the same position in a vertical direction, and a horizontal distance between said two correction units is equal to the predetermined spacing.

2. The apparatus according to claim 1, wherein
   said correction unit comprises a shift lens arranged in each of said two optical systems, wherein said shift lens are movable in a direction perpendicular to the optical axis, and
   said correction control unit performs control such that in the plane perpendicular to the optical axis, centers of said two shift lenses exist in the same position in the vertical direction, and a horizontal distance between said two shift lenses is equal to the predetermined spacing.

3. The apparatus according to claim 2, wherein if one of the displacement amounts of said two correction units detected by said displacement detection unit exceeds a predetermined amount, said correction control unit performs control such that a distance between the centers of said two shift lenses is equal to the predetermined amount.

4. An image sensing device including an optical apparatus cited in claim 1, comprising:
   two image sensing units; and
   a cropping unit configured to generate images, having a predetermined size, cropped from two images obtained by said two image sensing units;
   wherein a correction unit of said optical apparatus changes a cropping range of the image based on a shake detected by a shake detection unit of said optical apparatus, and
   a correction control unit of said optical apparatus performs control such that in a plane perpendicular to the optical axis, two pixels having output centers of the images having the predetermined size on said two image sensors exist in the same position in a vertical direction, and a horizontal distance between said two image sensors is equal to the predetermined spacing.

5. The device according to claim 4, wherein if one of displacement amounts of said two image sensors detected by a displacement detection unit of said optical apparatus exceeds a predetermined limit amount, said correction control unit performs control such that a distance between a pixel having output the center of the image and a pixel having output the center of the image having the predetermined size to be cropped from the image is equal to the limit amount.

6. An image sensing device including two optical systems arranged parallel at a predetermined spacing, comprising:
   two image sensing units;
   a cropping unit configured to generate images, having a predetermined size, cropped from two images obtained by said two image sensing units;
   a shake detection unit configured to detect a shake of said image sensing device, wherein said shake detection unit detects at least a rotational shake amount around an optical axis of said optical system;
   a displacement detection unit configured to detect a displacement amount in a plane perpendicular to the optical axis when rotation occurs around the optical axis of said optical system, for each of said two image sensing units;
   two correction units configured to correct image blur of optical images formed by said optical systems, based on the displacement amount detected by said displacement detection unit and the rotational shake amount detected by said shake detection unit; and
   a correction control unit configured to control such that in a plane perpendicular to the optical axis, two pixels having output centers of the images having the predetermined size on said two image sensors exist in the same position in a vertical direction, and a horizontal distance between said two image sensors is equal to the predetermined spacing.

7. The device according to claim 6, wherein if one of displacement amounts of said two image sensors detected by a displacement detection unit of said optical apparatus exceeds a predetermined limit amount, said correction control unit performs control such that a distance between a pixel having output the center of the image and a pixel having output the center of the image having the predetermined size to be cropped from the image is equal to the limit amount.

8. A control method of an optical apparatus including two optical systems arranged parallel at a predetermined spacing, and two correction units configured to correct image blur, comprising:
   a step of detecting a shake of the apparatus, at least a rotational shake around an optical axis of the optical system being detected;
   a displacement detection step of detecting a displacement amount in a plane perpendicular to the optical axis when rotation occurs around the optical axis of the optical system; and
   a control step of performing control such that in the plane perpendicular to the optical axis, the two correction units exist in the same position in a vertical direction, and a horizontal distance between the two correction units is equal to the predetermined spacing.

9. A control method of an image sensing device including two optical systems arranged parallel at a predetermined spacing, and two image sensing units comprising:
   a cropping step of generating images, having a predetermined size, cropped from two images obtained by said two image sensing units;

a step of detecting a shake of said image sensing device, at least a rotational shake amount around an optical axis of said optical system;
a displacement detection step of detecting a displacement amount in a plane perpendicular to the optical axis when rotation occurs around the optical axis of said optical system, for each of said two image sensing units;
two correction step correcting image blur of optical images formed by said optical systems, based on the displacement amount and the rotational shake amount; and
a correction control step of controlling such that in a plane perpendicular to the optical axis, two pixels having output centers of the images having the predetermined size on said two image sensors exist in the same position in a vertical direction, and a horizontal distance between said two image sensors is equal to the predetermined spacing.

* * * * *